United States Patent [19]
Bolger

[11] 3,882,493
[45] May 6, 1975

[54] DOPPLER CORRELATION RADAR EXHIBITING REDUCED TIME SIDE LOBES

[75] Inventor: Thomas Vincent Bolger, Pennsauken, N.J.

[73] Assignee: RCA Corporation, New York, N.Y.

[22] Filed: June 11, 1973

[21] Appl. No.: 368,660

[52] U.S. Cl. ........ 343/5 PD; 340/258 A; 343/55 A; 343/7.7
[51] Int. Cl. ...................... G01s 9/42; G08b 13/22
[58] Field of Search .... 340/258 A; 343/55 A, 5 PD, 343/7.7

[56] References Cited
UNITED STATES PATENTS

| | | | |
|---|---|---|---|
| 3,181,150 | 4/1965 | Ruppersberg et al. | 340/258 A |
| 3,386,094 | 5/1968 | Kratzer et al. | 343/7.7 X |
| 3,386,095 | 5/1968 | Stevens | 343/7.7 X |
| 3,388,398 | 6/1968 | Kratzer et al. | 343/7.7 X |
| 3,614,785 | 10/1971 | Kratzer | 343/7.7 |
| 3,716,823 | 2/1973 | Thompson et al. | 343/55 A X |
| 3,728,721 | 4/1973 | Lee et al. | 340/258 A X |
| 3,733,603 | 5/1973 | Johnston | 343/55 A |
| 3,778,828 | 12/1973 | McFarland | 343/7.7 |
| 3,781,859 | 12/1973 | Hermans | 343/7.7 X |
| 3,790,938 | 2/1974 | Anderson et al. | 343/7.7 |

*Primary Examiner*—Malcolm F. Hubler
*Attorney, Agent, or Firm*—Edward J. Norton; George J. Seligsohn

[57] ABSTRACT

Side lobe residue cancellation is achieved by the use of special types of transmitted code and decoding signals which results in the residues left over from imperfect decoding of undesired targets at uncorrelated ranges modulating a code group frequency, while desired correlated targets maintain their baseband structure. The undesired targets are eliminated by passing the resultant signal through a baseband audio filter. The special types of transmitted and decoding signals also preferably may be chosen to provide greater sensitivity to more distant targets than closer targets.

7 Claims, 4 Drawing Figures

MOVING TARGET CORRELATION RADAR

*PRIOR ART*

RANGE SENSITIVITY

DOPPLER CORRELATION RADAR EXHIBITING REDUCED TIME SIDE LOBES

This invention relates to doppler correlation radar systems and, more particularly, to such a system exhibiting reduced time side lobes.

In U.S. Pat. No. 3,386,095, issued to G. H. Stevens on May 28, 1968, there is disclosed a doppler correlation radar system designed particularly for detecting and locating moving targets such as enemy soldiers or vehicles that are moving under cover of darkness or under cover of a forest, for example. In this system, a continuous wave carrier signal is phase modulated in accordance with a preselected binary code, received echo signals are mixed with the carrier signal then being transmitted, and the mixed output is correlated against a locally derived binary decoding signal to produce an audio doppler signal manifesting a moving target. The radar operator listens to the doppler audio signal over phones which are provided. This system may be alternatively operated either in an "all range" mode or a "range bins" mode, depending upon the position of a mode selection switch therein. In the "all range" position, one type of coding consisting of a pair of square wave signals having certain preselected frequencies, are utilized respectively for the preselected code which phase modulates the carrier signal and for the locally derived code which is correlated against the mixed output. This provides a (STC) sensitivity time control that varies the receiver sensitivity time control that varies the receiver sensitivity as a function of the range of any received moving target so that the doppler signal amplitude of any moving target is substanially independent of the range of the target (i.e., the sensitivity of the receiver varies directly as a fourth power of the range of a moving target, since the power from the received echo from a moving target varies inversely as the fourth power of the range of that target). In the case of the "range bin" mode, another type of coding is utilized, which consists of a pseudo-random code as the transmitted preselected code. The same pseudo-random code with a selected delay is employed as the locally derived decoding signal.

In U.S. Pat. No. 3,614,785, issued to D. L. Kratzer on Oct. 19 1971, there is disclosed a doppler correlation radar system which employs a novel preselected code for phase modulating the continuous carrier signal of the doppler correlation radar system which inherently is capable of providing both (STC) sensitive time control in the performance of the "all range" function of the system, while also being inherently capable of performing the "range bins" function of the system. This results in a doppler correlation radar system with two time-multiplexed channels for simultaneously manifesting both "all range" information and "range bins" information.

In manifesting "range bins" information, both the doppler correlation radar system of U.S. Pat. No. 3,386,095 and U.S. Pat. No. 3,614,785 are restricted in their performance in achieving range resolution by the time side lobe rejection of the pseudo-random code employed, as well as by the electronics which are used to implement the radar. In the prior systems, the theoretical limit on the maximum value of the ratio between the amplitude of any correlated moving target and the uncorrelated side lobes of a doppler correlation radar system employing a pseudo-random code is determined by the length of the pseudo-random code. In a typical doppler correlation radar system of this type employing a pseudo-random code having a length in the order of 1,000 bits, theoretically, the amplitude of the uncorrelated side lobes may be at most 60db below that of the amplitude of a correlated moving target.

In practice, due to imperfection in transmitter phase stability, receiver transient and/or receiver gain balance, the side lobe rejection capability of the system is degraded. Thus, in the case where the theoretical value of side lobe rejection is 60db the best rejection which has been achieved in production is only approximately 40db. The effect of this is to restrict the range ratio between the maximum desired target range and minimum unwanted target range for which the correlation radar can be employed. Since the amplitude with which a target echo is received there is inversely the fourth power range, with only a 40db time side lobe rejection, the ratio of the maximum to minimum ranges, in this case, is limited to ten to one before close-in targets are detected as far-out targets of the same size. The ratio is even smaller when close-in targets are larger in cross section than far-out targets. Based upon this range ratio of ten to one, side lobe rejection permits coverage only to a maximum range of 1,000 meters, if close-in targets are restricted to ranges of greater than 100 meters.

In particular, if it were attempted to observe ranges greater than 1,000 meters with a system having a side lobe rejection of only 40db, the power of received echo signals from this observation range would be smaller than the side lobe power of unwanted targets at 100 meters. This would cause target spill over and thus a single target would be incorrectly indicated. In order to eliminate this problem for systems with range ratios of greater than ten to one and as large as thirty-two to one, side lobe rejection must be capable of actually reaching 60db or more.

The present invention describes a system which is capable of reaching side lobe rejections of 60db or more, without requiring any changes in the transmitter phase stability, receiver transients and/or receiver gain balance.

In accordance with the present invention, both the transmitted code signal and the locally-derived decoding signal are modified to provide side lobe residue cancellation iin which the side lobe signal residue of one complete code group is subtracted from that of an adjacent code group. Furthermore, in a preferred form of the present invention, the correlated outputs from adjacent code groups are added for long range targets. Basically, this is accomplished by modulating the residues left over from imperfect decoding for uncorrelated ranges at a code group frequency, which translates all uncorrelated unwanted baseband target components up to a code-group frequency carrier with amplitude-modulated doppler frequency side bands, while correlated targets, which are the targets of interest, maintain their baseband structure. The undesired uncorrelated targets are then eliminated by passing the resultant signal through a baseband audio filter, which passes only the baseband doppler frequency of the correlator targets.

These and other features and advantages of the present invention will become more apparent from the following detailed description taken together with the accompanying drawing, in which.

Figure 1:
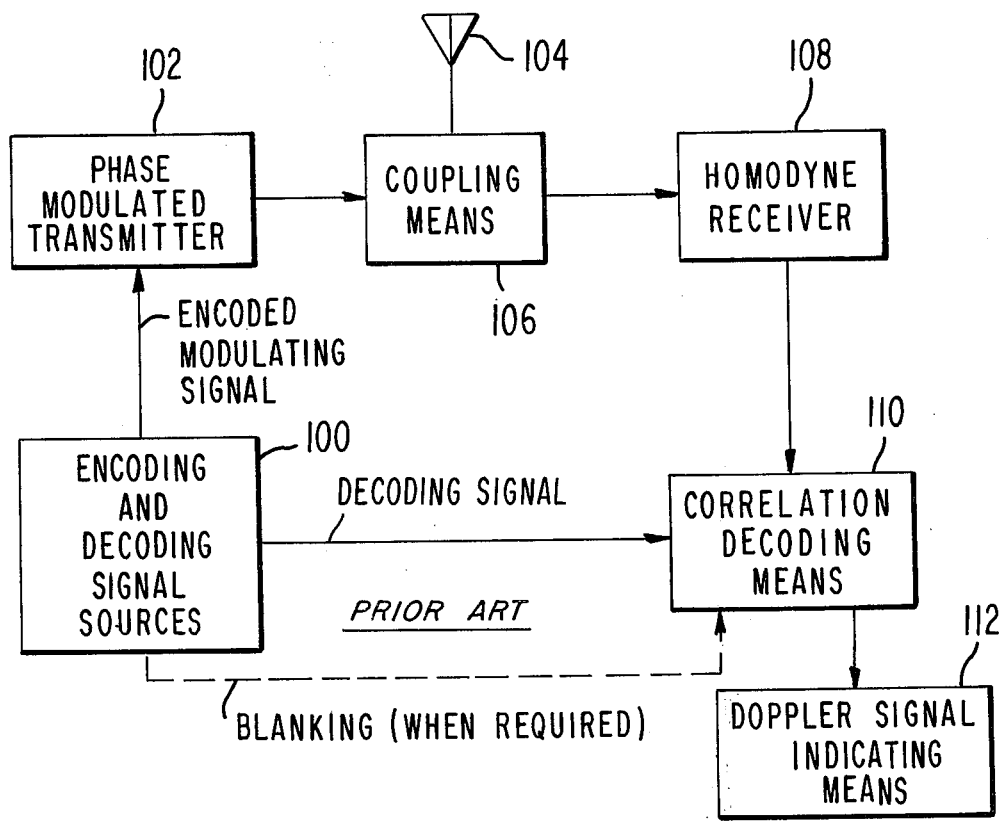
FIG. 1 is a block diagram of a typical doppler correlation radar system.

Referring to FIG. 1, there is shown a block diagram of a moving target correlation radar which is generic to the systems disclosed in each of the aforesaid U.S. Pat. Nos. 3,386,095 and 3,614,785, as well as the system of the present invention.

As shown in FIG. 1, encoding and decoding signal sources 100 applies an encoded modulating signal as an input to phase-modulated transmitter 102. By way of example, the carrier frequency of phase-modulator transmitter 102 may be at 9250 MHz. The encoded modulating signal is in the form of a stream of binary bits. The relative phase of the carrier-frequency output of transmitter 102, when phase modulated by bits manifesting a binary ONE, differs by substantially 180° from the carrier-frequency output thereof when phase modulated by the bits manifesting a binary ZERO. The phase-modulated carrier frequency output transmitter 102 is forwarded to antenna 104 by coupling means 106, which may include a circulator. Coupling means 106 also couples a small portion of the phase-modulated output of transmitter 102 directly to the input of homodyne receiver 108. Antenna 104, besides transmitting the signal forwarded thereto by coupling means 106 from transmitter 102, also receives target echo signals. These target echo signals are forwarded by coupling means 106, such as through the circulator thereof, to the input of homodyne receiver 108. Homodyne receiver 108 includes a balanced mixer for hetrodyning the target echo signal input thereto against the directly-forwarded input thereto from transmitter 102. Such hetrodyning results in a substantially zero beat baseband video signal in response to received echoes from all stationary targets. However, in response to received echoes from a moving target, such hetrodyning results in a non-ZERO beat signal which includes a doppler frequency component. This doppler frequency component is applied from homodyne receiver 108 as the doppler offset baseband video signal input to correlation decoding means 110.

Corresponding to any encoded modulating signal produced by encoding and decoding signal sources 100 is at least one decoding signal. This decoding signal is applied as a reference input to correlation decoding means 110. In certain cases, as in either the "all range" or "range bins" mode of the system disclosed in the aforesaid U.S. Pat. No. 3,386,095, correlation decoding means 110 is operated continuously. When this is so, there is no need to ever blank correlation decoding means 110 and, therefore, encoding and decoding signal sources 100 does not provide a blanking signal. However in other cases, such as in the system disclosed in the aforesaid U.S. Pat. No. 3,614,785 and in the system of the present invention, correlation decoding means 110 is operated discontinuously. In these other cases, encoding and decoding signal sources 100 provides a blanking signal to correlation decoding means 110 to disable correlation decoding means 110 at certain times to thereby permit correlation decoding means 110 to operate only intermittently to produce a doppler signal output therefrom. The doppler output from correlation decoding means 110, whether or not correlation decoding means 110 is operated continuously or discontinuously, is applied as an input to and is manifested by a doppler signal indicating means 112.

As more fully described in the aforesaid U.S. Pat. No. 3,386,095, when the moving target correlation radar system disclosed therein is operated in its "all range" mode, the encoded modulating signal is a square wave having a first frequency, such as 150 KHz for example, and the decoding signal is a square wave having a second frequency twice the first frequency, such as 300 KHz for example. In this "all range" mode of the system disclosed in the aforesaid U.S. Pat. No. 3,386,095 correlation decoder means 110 provides an output manifested by doppler signal indicating means 112 for all targets within a certain maximum range receiver by antenna 104. Furthermore, the sensitivity of correlation decoding means 110 will vary substantially as the fourth power of the range to a target, so that the amplitude of the doppler signal output from correlation decoding means 110 will be substantially independent of the range to a target, i.e., correlation decoding means 110 will exhibit sensitivity time control (STC). Thus, in the "all range" mode, the moving target correlation radar detects the presence of a target, but does not give any indication of the range thereto.

In the "range bins" mode of the aforesaid U.S. Pat. No. 3,386,095, the encoded modulating signal comprises successive sequences of the ame pseudorandom binary-bit code group. By way of example, this code group may consist of a series of 1,023 bits (the number of bits of a maximum-length pseudo-random code generated by a shift register having ten stages).

The corresponding locally derived decoding signal comprises the product of encoded modulating signal delayed selectively by an amount corresponding to the approximate range of a particular target multiplied by the encoded modulating signal being transmitted. (The reason for this multiplication is to compensate for the effective multiplication which takes place in the balanced mixer of the homodyne receiver between the received target echo signal and the directly applied transmitted signal from transmitter 102.)

In the aforesaid U.S. Pat. No. 3,614,785, one-half of the bits in each code group sequence of the encoded modulating signal vary in binary value in a pseudo-random manner, while the bits of the other half of each code group all have the same binary value. This type of encoding makes it possible to time-multiplex the "all range" function and the "range bins" function in the system of U.S. Pat. No. 3,614,785. Correlation decoding means 110, for the system of U.S. Pat. No. 3,614,785, includes two correlation decoders (one for each channel), each of which correlates the doppler signal input against separate decoding signal inputs from encoding and decoding signal sources 100. Furthermore, each of the two channels may employ its own doppler signal indicating means, such as an earphone for "all range" and an A.C. meter for "range bins".

The present invention is directed to an improvement in the "range bins" function of the moving target correlation radar. The "all range" function of the moving target correlation radar of the present invention may be conventional. In this case, the "all range" function of this moving target correlation radar may be performed in the manner disclosed in the aforesaid U.S. Pat. No. 3,386,095. Alternatively, the "all range" function may be performed in the manner disclosed in either of my copending U.S. Pat. applications Ser. No. 368,869 (RCA 63,505) or Ser. No. 368,661 (RCA 63,506) filed on even date herewith and assigned to the same assignee as the present application.

Figure 2:
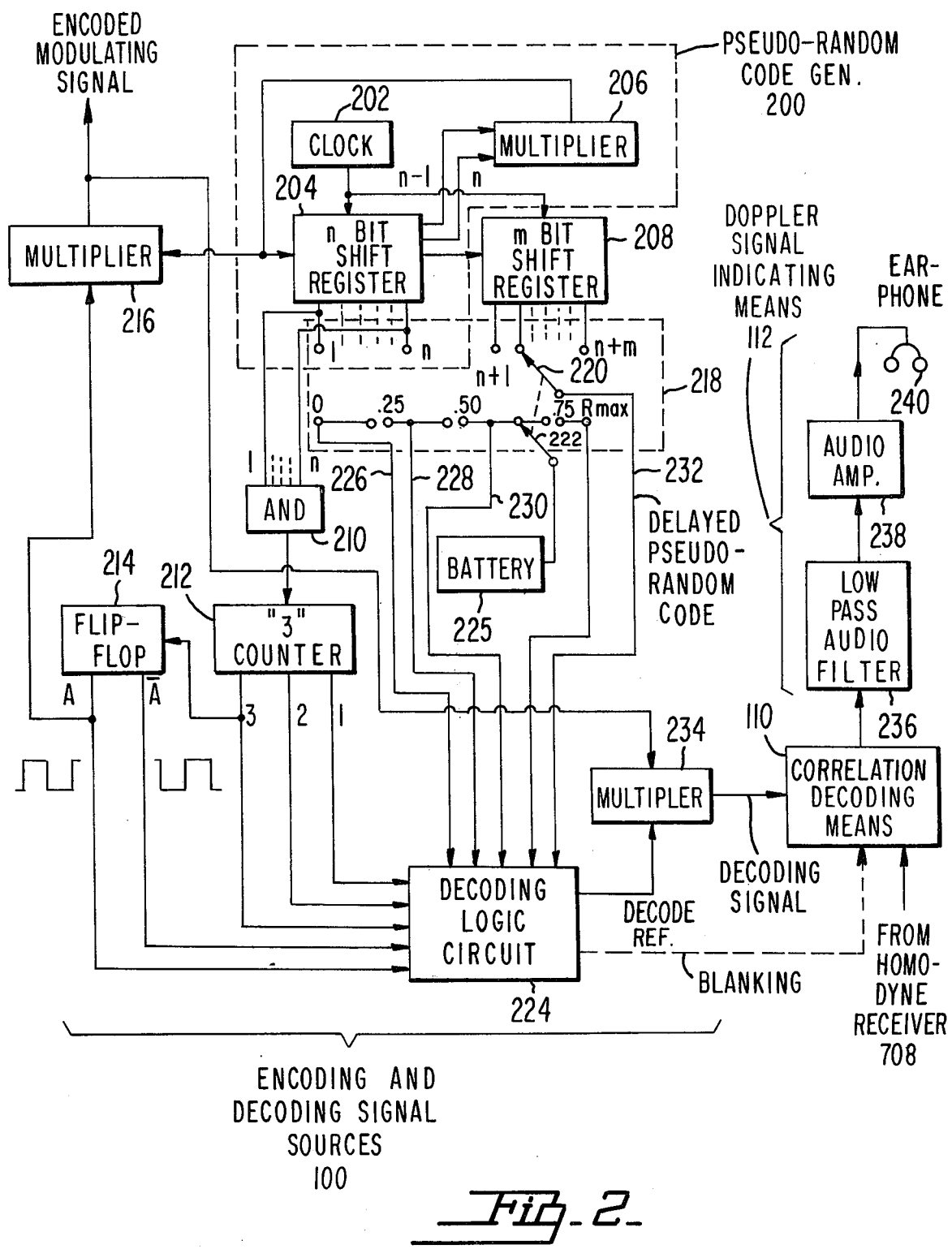
FIG. 2 is a functional block diagram of a doppler correlation radar system of the type shown in FIG. 1 incorporating the present invention.

Referring now to FIG. 2, there is shown an embodiment of encoding and decoding signal sources 100, correlation decoder means 110 and doppler signal indicating means 112 for performing the "range bins" function of a moving target correlation radar in accordance with the principles of the present invention.

FIG. 2 shows a conventional pseudo-random code generator 200, which comprises clock 202, $n$ bit shift register 204 and multiplier 206 for applying the product of the $(n-1)$th and $n$th stages as an input thereto. As in known, a pseudo-random code generator employing an $n$ bit shift register will generate a maximum-length pseudo-random code group having $(2^n-1)$ bits. As shown, $n$ bits shift register 208 is serially coupled to $n$ bit shift register 204, with both shift registers 204 and 208 being shifted in synchronism with clock pulses from clock 202. Thus, shift registers 204 and 208 include a total of $(n+m)$ stages, each of which is provided with its own individual ouptut terminal. output In accordance with a principle of the present invention, the duration of each pseudo-random code group is no greater than and is normally shorter than the duration corresponding to the maximum range, $R_{max}$, of interest. A code group duration corresponding to $0.5R_{max}$, while not essential, appears to be optimum. For illustrative purposes in describing the invention, it will be assumed that $R_{max}$ is 5,040 meters and that the clock frequency is 3.75 MHz. This clock frequency will divide the 5,040 meter maximum range into 126 range bins of 40 meters each. It is further assumed that $n$ has a value equal to six. This provides a maximum-length pseudo-random code group consisting of 63 bits. The value of $m$ will be assumed to be 120. Thus, the total value $(n+m)$ is 126, and the individual stages of shift registers 204 and 208 correspond to individual ones of the 126 range bins. It should be noted that under these assumed values, the duration of each 63 bit pseudo-random code group corresponds to a range of 2,520 meters, which is just equal to the optimum value of one-half the maximum range of 5,040 meters.

AND gate 210, which has the output from each of the respective $n$ stages of shift register 204 applied as an individual input thereto, derives a pulse output at the end of each successive pseudo-random code group. The output from AND gate 210 is applied as an input to cyclic "3" counter 212. Counter 212 applies a pulse to its "1" output conductor at the end of the first, fourth, seventh, etc. pseudo-random code group; applies a pulse to its "2" output conductor at the end of the second, fifth, eighth, etc. pseudo-random code group, and applies a pulse to its "3" output conductor at the end of the third, sixth, ninth, etc. pseudo-random code group. The pulse on the "3" output conductor of counter 212 is applied as a switching input to flip-flop 214 to switch flip-flop back and forth between its two states in response to successive pulses onn the "3" output conductor of counter 212. This results in flip-flop 214 generating a square wave on its A output conductor and on its A having a period six times as long as the duration of a pseudo-random code group. As shown in FIG. 2, the signal on the A output conductor of flip-flop 214 has a relatively positive level (corresponding to the digital value +1) during a first half-cycle thereof, (which lasts for the duration of three consecutive pseudo-random code groups). This if followed by a relatively negative level (corresponding to the digital value $-1$) during the second half cycle thereof, (which lasts the duration of an additional three consecutive pseudo-random code groups). In the case of the A output of flip-flop 214, the first half-cycle has a relatively negative level (corresponding to the digital value $-1$) and the second half-cycle has a relatively positive level (corresponding to the digital value +1).

Figure 3:
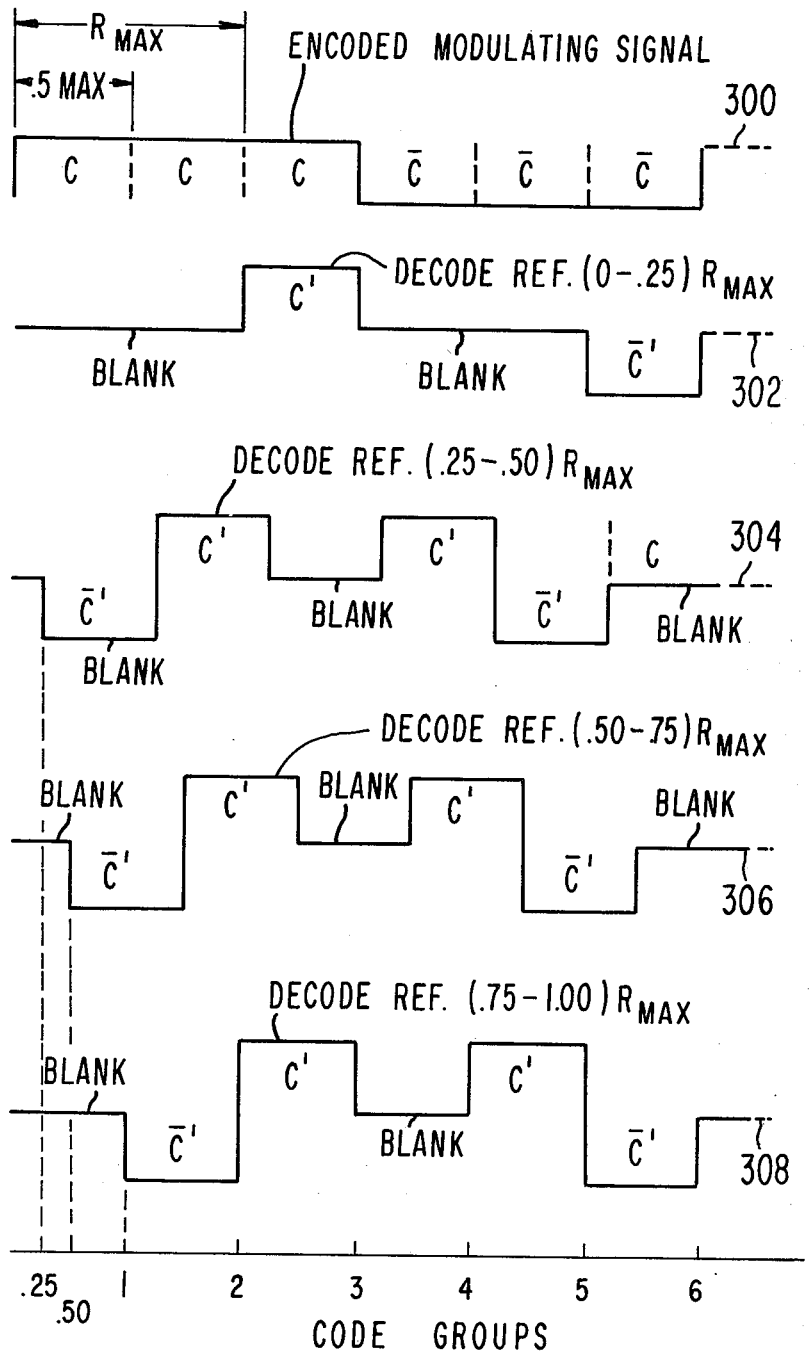
FIG. 3 shows timing diagrams helpful in explaining the operation of the present invention.

The successively occurring pseudo-random code groups present on the output from multiplier 206 are applied as a first input to multiplier 216 and the A output of flip-flop 214 is applied as a second input to mutliplier 216. The effect of multiplier 216 is to multiply the three consecutive code groups occurring during each first half-cycle of output A of flip-flop 214 by the digital value plus one, and to multiply the three consecutive pseudo-random code groups occurring during each second half-cycle of output A of flip-flop 214 by the digital value minus one. The output from multiplier 216, which constitutes the encoded modulating signal applied to phase-modulated transmitter 102 of FIG. 1, is shown in timing diagram 300 of FIG. 3. In this diagram, C represents the time of occurrence of each pseudo-random code group and C represents the time of occurrence of each complement of a pseudo-random code group. As shown in timing diagram 300, three pseudo-random code groups occur in sequence followed by three complements of pseudo-random code groups in sequence. By "complement" is meant that the binary value of each ordinal bit of code group C is the complement of the binary value of the corresponding ordinal bit of code group C. As indicated in FIG. 3, the duration of each code group corresponds to $0.5R_{max}$, so that the duration of two successive code groups corresponds with $R_{max}$.

Returning to FIG. 2, two-gang "range bins" switch 218 includes mechanically coupled wipers 220 and 222. Wiper 220, which is selectively connectable to $(n+m)$ terminals. (each individually associated with a different stage of shift registers 204 and 208), applies a delay pseudo-random code as an input to decoding logic circuit 224. Wiper 222, which is coupled to battery 225, selectively applies a marking signal to a selected one of conductors 226, 228, 230, and 232 in accordance with the particular one of the $(n+m)$ terminals to which the wipers of switch 218 are then set. More specifically, as shown in FIG. 2, the switch terminals associated with wiper 222 are divided into four approximately equal groups. The first group, corresponding to ranges up to about $0.25R_{max}$, are connected in common to conductor 226; the second group, corresponding to a range between 0.25 and $0.50R_{max}$, are connected in common to conductor 228; the third group, corresponding to the range between about 0.50 and $0.75R_{max}$, are connected in common to conductor 230, and the fourth group, corresponding to a range about 0.75 to $1.0R_{max}$ are connected in common to conductor 232. By way of example, in the assumed case where $(n+m)$ has a value of 126, the first group may include values from 1–32, the second group may include values from 33–63, the third group may include values from 64–94 and the fourth group may include values from 95–126. Although in this specific embodiment shown, the terminals of the switch with which wiper 222 is associated are divided into four groups, this particular number of groups is not essential. In general, the number of groups, each with its own marking conductor, may be either greater or fewer. Furthermore, the increments of range covered by each group need not be equal to each other. In any case, all of the group marking conductors, such as conductors 226, 228, 230 and 232, are applied as respective inputs to decoding logic circuit 224.

Decoding logic circuit 224 also receives inputs from three respective outputs of "three" counter 212 and from both the A and A outputs of flip-flop 214. As will be understood by one skilled in the art, decoding logic 224 may include various gates, flip-flops, multipliers and/or delay means, responsive to the respective inputs thereto, for selectively forwarding either the delayed pseudo-random code itself or the complement thereof as a decode reference output only during certain "window" time intervals determined by the marked one of conductors 226, 228, 230, and 232. The rest of the time decoding logic circuit 224 applies a blanking output therefrom. This decode reference output will be discussed in more detail below, since it is responsible for the advantages of the present invention.

As discussed above in connection with FIG. 1, correlation decoding means has the baseband video doppler signal output from homodyne receiver 108 applied as a first input thereto. As a result of the homodyne receiving process, this signal input does not correspond to the received doppler signal itself, but corresponds to the product of the received doppler signal multiplied by the encoded modulating signal then being transmitted. In order to compensate for this, the decode reference output of decoding logic circuit 224 cannot be used directly as the decoding signal for correlation decoding means 110, but must be multiplied in multiplier 226 by the encoded modulating signal. This decoding signal is supplied as a second input to correlation decoding means 110. Correlation decoding means 110 is disabled in response to a blanking signal applied as a third input thereto from decoding logic circuit 224.

Correlation decoding means 110 is effective during the "window" provided by the decode reference (when the blanking signal is absent) in correlating the first input thereto from homodyne receiver 108 against the decoding signal applied as a second input thereto. This provides a decoded output therefrom which includes an audio doppler signal, as well as other relatively high frequency spurious components which will be discussed in more detail below. The output signal from correlation decoding means 110 is applied as an input to doppler signal indicating means 112, which includes low pass audio filter 236, audio amplifier 238 and earphone 240 connected as shown, to acoustically manifest the doppler signal to a radar operator over phone 232.

Returning to FIG. 3, there is shown, besides timing diagram 300 of the encoded modulating signal (discussed above) respective timing diagrams 302, 304, 306, and 308. Timing diagram 302 manifests the decode reference from decoding logic circuit 224 in response to a marking signal present on conductor 226. Similarly, timing diagrsm 304, 306, and 308 respectively manifest this decode reference in response to a marking signal present on conductors 228, 230, and 232, respectively.

A decode reference having the form shown in timing diagram 302, in which blanking takes place two thirds of the time, is normally employed only for decoding relatively close targets, i.e., those within a range having an upper limit of $0.25 R_{max}$ or less depending on the absolute value of $R_{max}$. In the assumed case, where $R_{max}$ is 5040 meters, timing diagram 302 is employed as a decode reference only from a range between zero and one-quarter $R_{max}$. The fact that the received signal strength of relatively close targets is strong makes it possible to tolerate the reduced receiver sensitivity resulting from the long blanking periods in timing diagram 302.

For more distant targets, the decode reference employed has the form shown in timing diagrams 304, 306, and 308, in which blanking occurs only one-third of the time, rather than two-thirds of the time as in timing diagram 302. As shown, the form of each of timing diagrams 304, 306, and 308 is the same except for relative phase displacement with respect to each other and with respect to the encoded modulating signal shown in timing diagram 300. In particular, the decode reference shown in timing diagram 304 (has a relative phase in which blanking takes place for a time equal to one-quarter of a code group interval, after which the first "window" occurs.) In timing diagrams 306 and 308, respectively, the blanking time before the occurrence of the first "window" is one-half a code group interval and one full code group interval, respectively. As shown, timing diagram 304 is employed as the decode reference for a range between $(0.25-0.5)R_{max}$; timing diagram 306 is employed as a decode reference for a range between $(0.5-0.75)R_{max}$, and timing diagram 308 is employed as a decode reference for a range between $(0.75-1.0)R_{max}$.

As shown in FIG. 3, C corresponds to a transmitted pseudo-random code group, while C corresponds to a transmitted complement of this pseudo-random code group. C' corresponds to the pseudo-random code group C after it has undergone a delay determined by the setting of range bins switch 218. Similarly, C' corresponds to the complement of pseudo-random code group C after it has undergone a delay determined by the setting of range bins switch 218. As in known, switch 218 is set to provide a delay substantially equal to the delay of a received signal from a moving target under observation with respect to the transmitted signal. Therefore, the delayed code groups C' and C', after multiplication in multiplier 234, provide a decoding signal which will correlated with the portion of the output from homodyne receiver 108 corresponding to this observed target. The output from correlation decoding means 110 will thereby include a doppler component having an audio frequency determined by the velocity with which the observed target is moving. If the cut-off of low pass audio filter 236 is the order of 1,500 cycles, it will pass the doppler component from both relatively slow and relatively fast velocity observed moving targets. After amplification by autio amplifier 238, a moving target under observation will be heard over earphones 240 by the radar operator.

In addition to the desired component corresponding to the observed target, the output from homodyne receiver 108 applied to correlation decoding means 110 includes both noise and returns from targets at ranges other than that selected by range bins switch 218. With the decode reference signals employed in the prior art, this gives rise to unwanted, insufficiently attenuated, uncorrelated side lobe componets in the output of the correlation decoding means, which side lobes occur in the baseband along with the desired doppler component. The type of decoder reference signal employed in the present invention (shown in timing diagrams 302, 304, 306, and 308 of FIG. 3) provide much greater attenuation of unwanted uncorrelated side lobe components then was heretofore achievable.

In particular, the side lobe components are translated out of the baseband, in which the correlated doppler component resides, and appear instead as sidebands of a carrier frequency equal in value to the code-group repetition frequency. This carrier frequency is quite high. By way of example, under the assumed conditions, where the block frequency is 3.75 MHz and each code group consists of 63 bits, the code group repetition frequency is in the order of 60 KHz. If low pass audio filter 236 has a 3db break at 1,500 Hz and exhibits a 60db decode roll off at the side-lobe modulated-carrier frequency of 60 KHz, the unwanted uncorrelated side lobe portion of the output of correlation decoding means 110 will be attenuated by filter 236 by at least 60db with respect to the desired correlated portion of the output of correlation decoding means 110 corresponding to the observed target determined by the setting of range bins switch 218. Thus, residue cancellation is achieved.

Figure 4:
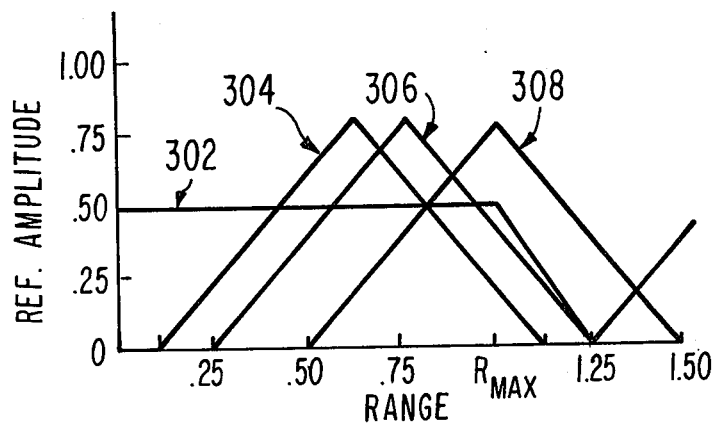
FIG. 4 shows range sensitivity graphs helpful in explaining the operation of the present invention.

As mentioned above and illustrated in the range sensitivity graphs of FIG. 4, the receiver sensitivity employing the decode reference of timing diagram 302 is relatively low compared to those of timing diagrams 304, 306, and 308. However, in the case of timing diagram 302, the value of this relatively low receiver sensitivity is a constant which is independent of the particular range bin to which range bins switch 218 is set within that range interval, $(0-0.25)R_{max}$, with which timing diagram 302 is employed. In the case of timing diagrams 304, 306, and 308 this is not true. In the case of timing diagram 308, the receiver sensitivity is at its highest (double the receiver sensitivity of timing diagram 302) only at $R_{max}$. The receiver sensitivity of timing diagram 308 is greater than that of timing diagram 302 over a range interval from $(0.75-1.25)R_{max}$, and reaches zero range sensitivity at $0.5R_{max}$ and at $1.5R_{max}$. Since, timing diagram 308 is only employed as a decode reference for the range interval $(0.75-1.0)R_{max}$, in operation it provides a receiver sensitivity which is always greater than that provided by timing diagram 302.

Due to the relative phase offsets of timing diagrams 304 and 306, the maximum sensitivity of timing diagram 304 will occur at $5/8R_{max}$ and the maximum sensitivity of timing diagram 306 will occur at $0.75R_{max}$.

In general, the number of range intervals into which the maximum range to be observed is divided, and the specific limits of each of these intervals, is a matter of choice in which the respective values of the minimum range to be observed, the maximum range to be observed, and the size of each range bin are the primary determining factors. In the example discussed above, the minimum range is zero, the maximum range is 5040 meters and each range bin is 40 meters. Where the minimum range to be observed is greater than zero, correlation decoding means 110 may be blanked for the entire range interval between zero and $R_{min.}$, as is known in the art.

What is claimed is:

1. In a moving target correlation radar system of the type comprising means for transmitting a continuous carrier wave modulated with a predetermined encoded modulating signal including a pseudo-random code sequence, means for demodulating echo signals received from any moving target within a given range illuminated with said transmitted signal, range bins switch means for selectively deriving a delayed pseudo-random code sequence having a delay corresponding to any one of a plurality of different range bins, means coupled to said range bins switch means for generating a decoding signal including a pseudo-random code sequence manifesting the delay selected by said range-bins switch means, and doppler frequency means including correlation decoding means for correlating said demodulated echo signals against said decoding signal to derive an output signal from said correlation decoding means which includes the doppler-frequency signature signal of a moving target having a range within the range bin selected by said range bins switch means; the improvement wherein:

both said transmitting means and said decoding signal generating means are respectively arranged to provide respective encoded modulating and decoding signals which result in the output from said correlation decoding means including both a relatively high frequency carrier component modulated by the time side lobes corresponding to the doppler-frequency signature signals of all received moving targets having a range outside of the selected range bin and a base-band component corresponding to the doppler frequency signature signal of only a received moving target having a range within the selected range bin, and said doppler-frequency means further includes doppler-frequency indicating means responsive only to the base-band component of the output from said correlation decoding means of a moving target.

2. The system defined in claim 1, wherein said doppler-frequency indicating means includes a low-pass filter for passing said base band component and rejecting said modulated-carrier component.

3. The system defined in claim 1, wherein said respective pseudo-random sequences of each of said encoded modulating and decoding signals are included within alternately-occurring first and second sets composed at least in part of serial code groups, the first set of said encoded modulating signal including a first predetermined number of contiguous code groups each having a given duration corresponding to the same certain range which is no greater than said given range, each code group of said first number manifesting either a given pseudo-random code of a given number of bits or its complement arranged in a first preselected format, the first set of said decoding signal including a second predetermined number of code groups each having said given duration, each code group of said second number manifesting a range-bins-delayed pseudo-random code of said given number of bits or its complement arranged in a second preselected format, said second set of each of said respective encoded modulating and decoding signals being the invert of the respective first set thereof, whereby the period of said modulated-carrier component is substantially equal to said given duration of each of said code groups.

4. The system defined in claim 3, wherein said given duration corresponds with one-half said given range.

5. The system defined in claim 3, further including means coupled to asid means for generating said decoding signal for dividing said given range into a plurality of range subintervals and controlling the generation of a different second preselected format for said code groups of said decoding signal for each of said plurality of range subintervals, said transmitting means providing a single first preselected format for all of said plurality of range subintervals.

6. The system defined in claim 5, wherein said first set of said encoded modulating signal consists of three contiguous code groups each manifesting the same given pseudo-random code, the duration of each code group being substantially equal to one-half said given range, and wherein said first set of said decoding signal for the closest of said range subintervals includes a single code group manifesting a range-bins delayed pseudo-random code having a duration corresponding to one-half said given range and occurring substantially isochronously with the last occurring one of said three contiguous code groups of said first set of said encoded modulating signal, said decoding signal for the closest of said range subintervals being a blank during the occurrence of the first two of said three contiguous code groups of said first set of said encoded modulating signals, and wherein said first set of said decoding signal for any other of said range subintervals includes two contiguous code groups each having a duration corresponding to one-half said given range, the first-occurring one of said two contiguous code groups manifesting a range-bins delayed pseudo-random code and the second-occurring one of said two contiguous code groups manifesting the complement of the code manifested by said first-occurring one thereof, the time of occurrence of said two contiguous code groups corresponding to any certain one of said other range subintervals having a predetermined phase relationship with respect to the occurrence of the code groups of said first set of said encoded modulating signal which depends on the value of the ranges included within said certain one of said other range subintervals with respect to said given range, said decoding signal for any other of said range subintervals being a blank during said first set in the absence of either of said two contiguous code groups thereof.

7. The system defined in claim 6, wherein there are a plurality of said other range subintervals, and wherein said predetermined phase relationship is different for each one of the other range subintervals.

* * * * *

UNITED STATES PATENT OFFICE
CERTIFICATE OF CORRECTION

PATENT NO. : 3,882,493
DATED : May 6, 1975
INVENTOR(S) : Thomas Vincent Bolger

It is certified that error appears in the above-identified patent and that said Letters Patent are hereby corrected as shown below:

Column 4, line 31, Change "ame" to --same--

Column 5, line 26, After "terminal." delete "output"

Column 5, line 67, Change "A" to --$\bar{A}$--

Column 6, line 9, Change "A" to --$\bar{A}$--

Column 6, line 29, Change "C" to --$\bar{C}$--

Column 7, line 14, Change "A" (second occurrence) to --$\bar{A}$--

Column 8, line 40, Change "C" to --$\bar{C}$--

Column 8, line 44, Change "C" to --$\bar{C}$--

Column 8, line 46, Change "C" to --$\bar{C}$--

Column 8, line 51, Change "C" (second Occurrence) to --$\bar{C}$--

Signed and Sealed this twenty-first Day of October 1975

[SEAL]

Attest:

RUTH C. MASON
*Attesting Officer*

C. MARSHALL DANN
*Commissioner of Patents and Trademarks*